Patented Aug. 1, 1950

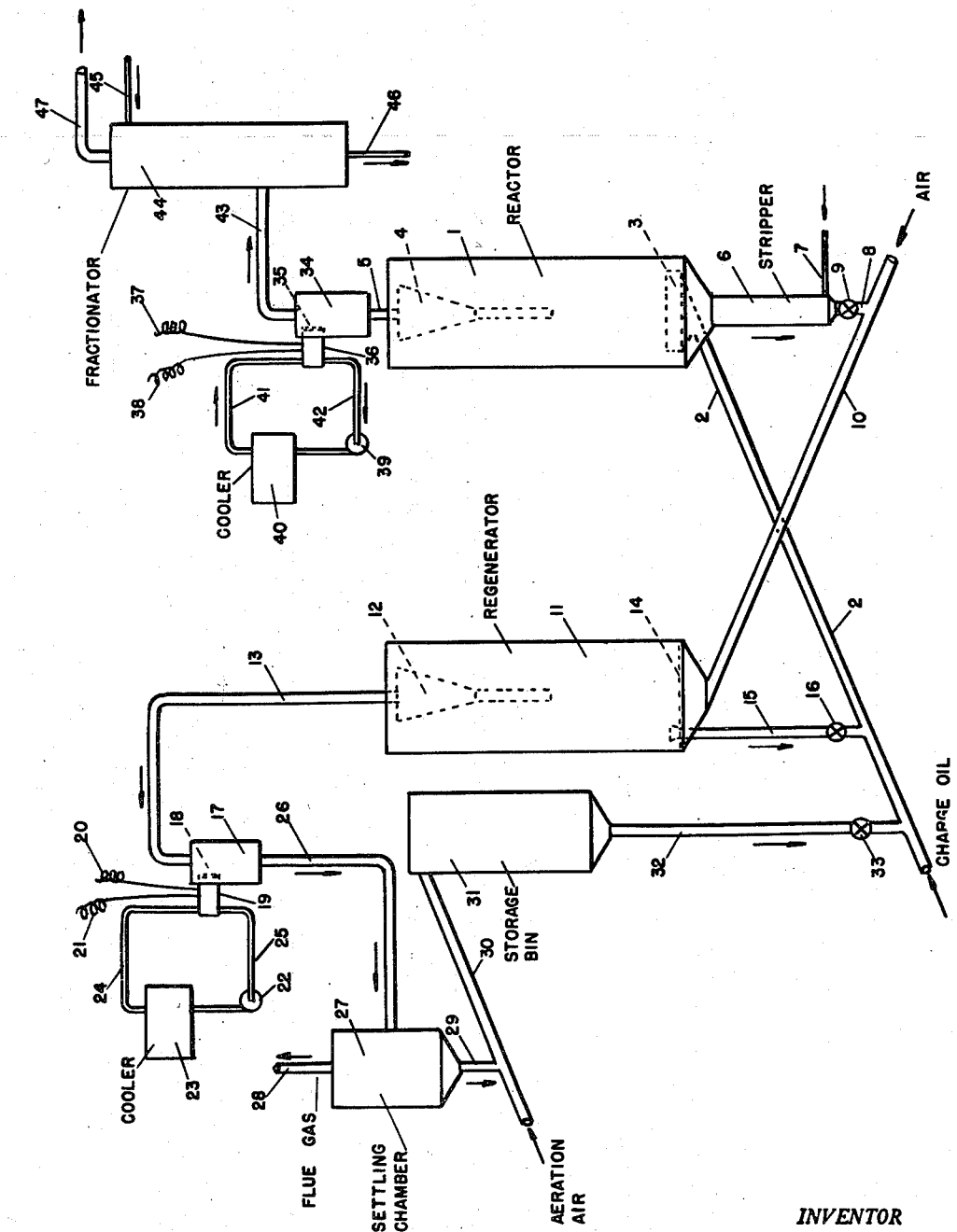

2,517,141

UNITED STATES PATENT OFFICE 2,517,141

PYROLYTIC CONVERSION OF HYDROCARBONS

Reading Barlow Smith, Hammond, Ind., assignor to Sinclair Refining Company, New York, N. Y., a corporation of Maine Application April 29, 1947, Serial No. 744,661

3 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst, at elevated temperature, is suspended in oil vapors, passed to a reaction zone in which conversion of the oil occurs and in which spent catalyst is separated from the oil vapors, the separated catalyst stripped of oil, regenerated by burning off coke or carbon deposited thereon, and the regenerated catalyst again suspended in the stream of oil vapors passing to the reaction zone. Operations of the type described are commonly designated fluid catalyst processes.

In conventional operation, the spent catalyst normally passes from the bottom of the reactor through a stripping column extending downwardly from the lower end of the reactor and in which the catalyst is contacted with steam for the purpose of removing, or stripping, from the catalyst vaporizable hydrocarbons remaining thereon. The stripped catalyst passes from the bottom of the stripper and is picked up by a stream of air and conveyed thereby into the bottom of the regenerator in which the catalyst, at elevated temperature, is intimately contacted with air, or other oxidizing gases, whereby carbonaceous deposits are burned off, and the regenerated catalyst is withdrawn from the regenerating zone and returned to the reactor.

Hydrocarbon vapors, product of the conversion, pass from the upper portion of the reaction zone through a cyclone separator, for the separation of larger suspended catalyst particles, and from thence to a fractionator in which insufficiently converted hydrocarbons are separated from the desired product.

In operations of this type, there is usually present in the catalyst, largely as a result of attrition of the catalyst during its repeated cycling through the system, extremely finely divided particles, or so-called fines, which are carried off from the reaction zone in suspension in the effluent hydrocarbon vapors. These finely divided particles of catalyst are extremely resistant to conventional methods of separation and even persist in the product which has undergone fractionation and condensation.

In gasoline, for instance, the presence of finely divided solids is extremely objectionable because of their tendency to form engine deposits in internal combustion engines in which the gasoline is customarily used.

In my copending application Serial No. 744,659, filed concurrently herewith, I have described and claimed an improved method of separating such fines from the effluent gases from the regenerator according to which the gaseous suspension is subjected to ultra-sonic vibrations by which the fines are caused to agglomerate and the agglomerates are separated as by settling and returned to the system.

My present invention provides an improved method whereby the finely divided particles of catalyst carried from the reactor in suspension from the hydrocarbon vapors may be effectively separated therefrom and either returned to the operation, or otherwise disposed of.

In accordance with my present invention, I subject the hydrocarbon vapors from the reaction zone, either before or after fractionation, to ultrasonic vibrations of the order of about one-half megacycle per second whereby the particles of finely divided catalysts dispersed in the effluent vapors are caused to coagulate or agglomerate to such an extent that they are readily separated, either in the subsequent fractionation, or by settling or filtration. The ultra-sonic vibrations may be generated in the known manner by the electrical excitation of a piezoelectric crystal, for instance, piezoquartz.

These vibrations may be imparted to the vapor suspension by passing the suspension through a chamber in contact with a diaphragm or a plurality of diaphragms, adapted to ultra-sonic vibrations and forming a partition between the chamber and a separate chamber filled with a liquid in which the piezoelectric crystal is submerged.

The present invention is used with particular advantage in conjunction with the invention of my previously referred to copending application in which catalyst fines are separated from the effluent gases from the regenerating operation and returned to the fluid catalyst cycle. In conventional operation, a considerable portion of catalyst fines are normally carried from the system in suspension in the flue gases. Where the fines are recovered and returned to the cycle, as there described, there is a greater tendency toward the accumulation of the catalyst fines in the cycle and contamination of the fractions of the converted hydrocarbons thereby. By the joint use of the recovery of the fines from the flue gases, substantial economy is effected while avoiding the presence of catalyst fines in the finished product.

The invention will be further described and illustrated with reference to the accompanying drawing which represents, conventionally and somewhat diagrammatically, a flow diagram of a fluid catalyst cracking operation embodying my invention.

Referring more particularly to the embodiment of the invention shown in the drawing, the apparatus indicated by the reference numeral 1, represents a generally cylindrical reactor of conventional type. The finely divided catalyst suspended in oil vapors enters the reactor through conduit 2 extending into the reactor and terminating in a conical member 3 of somewhat smaller maximum diameter than the reactor, and opening upwardly into the reactor through a conventional grid, not shown.

As the hot vapors pass upwardly through the reactor, there is a tendency for the catalyst to drop out of suspension, forming a so-called "dense phase" or "high density" body of catalyst in the reactor, from which the catalyst flows downwardly through the annular space between the member 3 and the walls of the reactor.

Oil vapors, products of the conversion, rise to the top of the reactor, pass through a cyclone type separator 4 for the removal of larger particles of suspended catalyst from the vapors, the latter passing therefrom through conduit 5 and the separated catalyst is returned to the dense phase body of catalyst in the reactor.

Spent catalyst is withdrawn from the bottom of the reactor into the upper end of stripper 6 and passes downwardly therethrough in contact with steam, or other gaseous stripping medium introduced into the bottom of the stripper through line 7. Stripped catalyst passes from the bottom of the stripper through conduit 8, in which there is interposed a valve 9, and flows into conduit 10 wherein it is picked up by a current of air, or other oxidizing gas, and carried upwardly into the regenerator 11.

In the regenerator, carbonaceous deposits are burned off from the catalyst by contact with the air, or other oxidizing gas introduced through conduit 10, the products of combustion passing from the upper portion of the regenerator through cyclone type separator 12 for the separation of the larger particles of suspended catalyst and from which the products of combustion pass through conduit 13, the separated catalyst being returned to the dense phase body of catalyst in the regenerator.

Regenerated catalyst is withdrawn from the bottom of the regenerator from a zone above the grid 14 through regenerated catalyst leg 15, in which there is interposed a valve 16, advantageously a conventional slide valve, for the control of the flow of catalyst therethrough into the lower end of conduit 2 where it is picked up by a stream of preheated charge oil passing to the reactor.

Flue gases passing from the regenerator through conduit 13 and carrying catalyst fines in suspension are passed through chamber 17 in which they are subjected to ultra-sonic vibration, transmitted to the suspension through diaphragm 18 forming a partition between chamber 17 and the contiguous chamber 19 in which there is a piezocrystal adapted to be excited, in the conventional manner, by high frequency electrical impulses transmitted to the crystal through electrical connections 20 and 21.

The crystal is protected from temperature rise due to heat transmitted through the diaphragm by continuously circulating a liquid cooling medium, oil, for instance, through the chamber 19 by means of pump 22, cooler 23, and connections 24 and 25. The cooling liquid also serves as a medium for transmitting the vibrations of the crystal to the diaphragm.

Flue gases, together with agglomerates of catalyst fines, pass from chamber 17 through conduit 26 to enlarged settling chamber 27 from which the flue gases pass through conduit 28 to a stack, not shown, and the separated catalyst passes through conduit 29 to an elevator conduit 30 wherein it is picked up by a current of aeration air and carried up into storage bin 31 from which it flows in a fluidized state through leg 32 into the lower end of conduit 2, where it is picked up by the current of hydrocarbon charge oil and carried into the reactor, together with catalyst from the regenerator. The flow of catalyst through leg 32 is regulated and controlled by valve 33.

Hydrocarbon vapors, having suspended therein catalyst fines which escaped separation by the cyclone separator 4, pass from line 5 through chamber 34 in which they are subjected to ultrasonic vibrations transmitted to the suspension through diaphragm 35 forming a partition between chamber 34 and the contiguous chamber 36 in which there is positioned a piezocrystal adapted to be excited in the conventional manner by high frequency electrical impulses transmitted to the crystal through electrical connections 37 and 38.

The crystal is protected from temperature rise due to heat transmitted through the diaphragm by continuously circulating a liquid cooling medium, oil, for instance, through the chamber 36 by means of pump 39, cooler 40 and connections 41 and 42. The cooling liquid also serves as a medium for transmitting the vibrations of the crystal to the diaphragm.

In passing through chamber 34, the suspended catalyst fines are caused to coagulate by the ultra-sonic vibrations, forming agglomerates of such size and character as to be readily separated from the hydrocarbon vapors in the fractionator, the vapors passing from the fractionator being substantially free from suspended particles of catalysts.

The hydrocarbon vapors, with agglomerates of the catalyst fines suspended therein, pass from chamber 34 through line 43 to fractionator 44, of a conventional type, a bubble tower, for instance, wherein the heavier hydrocarbon constituents are condensed and flow downwardly through the tower in contact with the rising vapors and wash from the vapors the agglomerates of catalyst fines suspended therein. A light hydrocarbon fraction may be introduced into the upper end of the tower through line 45 to accomplish the fractionation of the hydrocarbon vapors and the washing of the agglomerates of catalyst fines from the vapors.

Unvaporized liquid heavier hydrocarbons are withdrawn from the lower end of the fractionator through lines 46 carrying therewith agglomerates of the catalyst fines and may be recycled through the system. Uncondensed hydrocarbon vapors, substantially free from catalyst fines, are removed from the upper end of the fractionator through line 47 and further separated and condensed in the usual manner.

For simplicity, I have shown a single vibrating diaphragm in the chambers 17 and 34, respectively. It will be understood, however, that a plurality of such diaphragms may be employed and are usually desirable. Advantageously, I employ in each of these chambers a plurality of diaphragms so designed and operated as to impart to the respective suspensions passing therethrough vibratory energy equivalent to about 250 acoustical watts per cubic foot of volume of the chamber.

As previously noted, the ultra-sonic coagulation of the catalyst fines in the effluent vapors from the reactor is used with particular advantage in conjunction with the ultra-sonic agglomeration of the catalyst fines in the flue gases. However, the agglomeration of fines in the vapors may be used, with advantage, either with or without the separation and return to the system of the fines normally present in the flue gases.

It will also be understood that the utility of the present invention is not restricted to the particular embodiment thereof herein described, but is applicable to various modifications of fluid catalyst processes in which catalyst fines are carried off in suspension in effluent vapors from the fluid catalyst reactor.

The catalyst employed may be of the type conventionally used in fluid catalyst processes, for instance, a silica-alumina type catalyst in finely divided or powdered form. The reaction conditions may likewise be those conventionally used in operations of this type and, as understood in the art, the optimum temperatures and pressures employed will depend primarily upon the type of feed stock used, the particular catalyst employed and the reaction desired.

In cracking gas oil, for instance, the reaction temperature may, with advantage, be within the range of 800° to 1,000° F. and the pressure at the top of the reactor within the range of about 5 to 25 pounds per square inch. The regeneration temperature may be within the range of 950° to 1,200° F., heat for the reaction being supplied in large measure by the hot catalyst passing into the charge oil from the regenerator.

The invention is not restricted to the particular means shown for generating the ultra-sonic vibrations or imparting the vibrations to the suspensions but contemplates other known means for imparting energy in the form of ultra-sonic vibrations to the respective suspensions. Further, ultra-sonic vibrations varying somewhat from the specific frequency given may be used without departing from the spirit of the invention and may be more or less effective in coagulating catalyst fines of some types.

I claim:

1. In a fluid catalyst process for the conversion of hydrocarbons in which hydrocarbon vapors at an elevated temperature are intimately contacted with a finely divided catalyst in a reaction zone, converted hydrocarbon vapors carrying residual catalyst fines in suspension pass from the reaction zone and are fractionated, the step of recovering the residual catalyst fines which comprises subjecting the vapor suspension, prior to fractionation, to ultra-sonic vibrations of the order of one-half megacycle per second whereby the catalyst fines are agglomerated, fractionally condensing the vapors and separating the agglomerates of catalyst fines in a heavier condensate formed in the fractionation of the vapors.

2. In a fluid catalyst process for the conversion of hydrocarbons in which hydrocarbon vapors at an elevated temperature are intimately contacted with a finely divided catalyst in a reaction zone, converted hydrocarbon vapors pass from the reaction zone carrying residual catalyst fines in suspension and are fractionated, the step of recovering the catalyst fines which comprises passing the vapor suspension prior to fractionation through a confined zone, subjecting the suspension therein to ultra-sonic vibrations of a frequency of the order of one-half megacycle per second and of an intensity equivalent to 250 acoustical watts per cubic foot, whereby the catalyst fines are agglomerated, fractionally condensing the vapors and separating the agglomerates of catalyst fines in a heavier condensate formed in the fractionation of the vapors.

3. In a fluid catalyst process for the conversion of hydrocarbons in which hydrocarbon vapors at an elevated temperature are intimately contacted with a finely divided catalyst in a reaction zone, converted hydrocarbon vapors are passed from the reaction zone carrying residual catalyst fines in suspension and are fractionated, spent catalyst is intermittently regenerated by burning off the carbonaceous material deposited thereon in a regenerating zone from which catalyst fines are carried off in suspension in the flue gases, the improvement which comprises passing the flue gas suspension through a confined zone and subjecting it therein to ultra-sonic vibrations of a frequency of the order of one-half megacycle per second and of an intensity equivalent to 250 acoustical watts per cubic foot, whereby the catalyst fines are agglomerated, separating the agglomerates of catalyst fines from the gases, returning the separated fines to the reaction zone, passing the converted hydrocarbon vapors containing the residual catalyst fines in suspension prior to fractionation to a confined zone and subjecting it therein to ultra-sonic vibrations of a frequency of the order of one-half megacycle per second and of an intensity equivalent to 250 acoustical watts per cubic foot, whereby the catalyst fines are agglomerated, fractionally condensing the vapors and separating the agglomerates of the catalyst fines in a heavier condensate formed in the fractionation of the vapors.

READING BARLOW SMITH.

REFERENCES CITED

The following references are of record in the file of this patent:

UNITED STATES PATENTS

| Number    | Name          | Date           |
|-----------|---------------|----------------|
| 2,215,484 | St. Clair     | Sept. 24, 1940 |
| 2,300,761 | Amy           | Nov. 3, 1942   |
| 2,315,734 | Ralston et al.| Apr. 6, 1943   |
| 2,393,554 | Ogorzaly      | Jan. 22, 1946  |
| 2,407,371 | Jahnig        | Sept. 10, 1946 |

OTHER REFERENCES

Bergmann, "Ultrasonics," pp. 212-216, John Wiley and Sons (1938).